United States Patent
Steidl et al.

(10) Patent No.: US 12,449,016 B2
(45) Date of Patent: Oct. 21, 2025

(54) CRANKSHAFT ARRANGEMENT WITH TORSIONAL VIBRATION DAMPER

(71) Applicant: Hasse & Wrede GmbH, Berlin (DE)

(72) Inventors: Michael Steidl, Berlin (DE); Michael Granzin, Hoppegarten (DE)

( * ) Notice: Subject to any disclaimer, the term of this patent is extended or adjusted under 35 U.S.C. 154(b) by 0 days.

(21) Appl. No.: 18/713,422

(22) PCT Filed: Nov. 23, 2022

(86) PCT No.: PCT/EP2022/082946
§ 371 (c)(1),
(2) Date: May 24, 2024

(87) PCT Pub. No.: WO2023/094433
PCT Pub. Date: Jun. 1, 2023

(65) Prior Publication Data
US 2025/0035183 A1    Jan. 30, 2025

(30) Foreign Application Priority Data
Nov. 26, 2021 (DE) ..................... 10 2021 131 087.3

(51) Int. Cl.
*F16F 15/14* (2006.01)

(52) U.S. Cl.
CPC ........ *F16F 15/145* (2013.01); *F16F 2222/06* (2013.01); *F16F 2222/08* (2013.01);
(Continued)

(58) Field of Classification Search
CPC ...... F16F 15/145; F16F 15/133; F16F 15/167; F16F 2222/06; F16F 2222/08;
(Continued)

(56) References Cited

U.S. PATENT DOCUMENTS

2013/0116054 A1    5/2013    Amano et al.
2015/0165858 A1    6/2015    Suissa
(Continued)

FOREIGN PATENT DOCUMENTS

DE    43 28 927 A1    3/1994
DE    10 2014 118 609 A1    6/2015
(Continued)

OTHER PUBLICATIONS

International Search Report (PCT/ISA/210) issued in PCT Application No. PCT/EP2022/082946 dated Mar. 27, 2023 with English translation (5 pages).
(Continued)

*Primary Examiner* — Grant Moubry
(74) *Attorney, Agent, or Firm* — Crowell & Moring LLP

(57) ABSTRACT

A crankshaft arrangement for a combustion engine includes a crankshaft and a torsional vibration damper having a primary mass and an inertia ring. The primary mass is fixedly connected to the crankshaft, and the inertia ring and the primary mass are coupled via a viscous fluid. The torsional vibration damper is attached to an output end of the crankshaft. The primary mass is coupled to a secondary coupling via an elastic coupling device. The torsional vibration damper is coupled to the secondary coupling via a feedback device. The secondary coupling is formed as a dual-mass flywheel with a primary flywheel, a secondary flywheel and the elastic coupling device. A method for damping torsional vibrations of a crankshaft of a crankshaft arrangement is provided.

14 Claims, 6 Drawing Sheets

(52) U.S. Cl.
CPC ..... *F16F 2222/12* (2013.01); *F16F 2228/063* (2013.01); *F16F 2232/02* (2013.01); *F16F 2236/08* (2013.01)

(58) Field of Classification Search
CPC ............. F16F 2222/12; F16F 2228/063; F16F 2232/02; F16F 2236/08; F16C 3/06
See application file for complete search history.

(56) References Cited

U.S. PATENT DOCUMENTS

| | | | |
|---|---|---|---|
| 2019/0024753 A1 | 1/2019 | Orlamuender et al. | |
| 2021/0215226 A1* | 7/2021 | Buck | F16F 15/134 |
| 2022/0412435 A1 | 12/2022 | Steidl et al. | |

FOREIGN PATENT DOCUMENTS

| | | |
|---|---|---|
| DE | 10 2016 200 906 A1 | 7/2017 |
| DE | 102017000375 A1 * | 7/2018 |
| DE | 10 2020 130 047 A1 | 5/2021 |
| EP | 3 521 656 A1 | 8/2019 |
| WO | WO 2017/158131 A2 | 9/2017 |
| WO | WO 2019/185196 A1 | 10/2019 |

OTHER PUBLICATIONS

German-language Written Opinion (PCT/ISA/237) issued in PCT Application No. PCT/EP2022/082946 dated Mar. 27, 2023 with English translation (7 pages).

German-language Office Action issued in German Application No. 10 2021 131 087.3 dated Mar. 30, 2022 (6 pages).

Bei, T. et al., "Mitsubishi Electric Entwickelt eine Passive Vorrichtung für die Regelung der Seilschwingungen bei Aufzügen in Hochhäusern", Mitsubishi Electric Corporation Public Relations Division, Feb. 7, 2019, pp. 1-4, URL: https://de.mitsubishielectric.com/de/newsevents/releases/global/2019/0207-b/pdf/190207-b_3251_de_de.pdf (4 pages).

* cited by examiner

State of the art

State of the art

CRANKSHAFT ARRANGEMENT WITH TORSIONAL VIBRATION DAMPER

BACKGROUND AND SUMMARY

The invention relates to a crankshaft arrangement with a torsional vibration damper. The invention also relates to a method for damping torsional vibrations of a crankshaft of a combustion engine.

The crankshafts of a reciprocating internal combustion engine are often connected to associated drive trains (e.g. gearboxes, generators, etc.) via flexible couplings (elastomer couplings), which isolate the drive trains from the rotational non-uniformity of the reciprocating engine. Rotational non-uniformity of a shaft refers to rotational speed fluctuations of the entire shaft.

The isolation frequency, i.e. the frequency above which vibrations are no longer transmitted, is mainly determined by the stiffness of the elastomer coupling, whereby a low stiffness leads to a lower isolation frequency. However, this stiffness cannot be chosen arbitrarily low, as otherwise the elastomer coupling cannot transmit the static torque and the static torsion angle becomes so large that the tensions in the elastomer material exceed the permissible limit. A compromise must therefore be found between the degree of isolation and the longevity of the elastomer coupling.

There are also other ways to reduce rotational non-uniformities, for example by using a tuned mass damper or a rotational speed-adaptive damper. For this purpose, an additional seismic mass is connected to the system and energy is diverted from the system to be damped into the vibration of the seismic mass by selecting suitable coupling parameters for the seismic mass, thereby generating a moment that calms the main system. The costs of the system with the seismic mass are seen as a disadvantage.

The document WO 2017/158 131 A2 describes a crankshaft arrangement with a torsional vibration damper. This specified combination, which is also referred to as a flywheel-integrated damper and coupling (FIDC), makes it possible to dampen torsional vibrations and isolate the drive train. It is considered a disadvantage that the isolation of the drive train does not provide any significant advantages over a conventional design in which the crankshaft is fitted with a damper at one front end and a coupling at the other.

Components with so-called negative mechanical stiffnesses have been proposed for vibration isolation. The required component, which forms such a negative mechanical stiffness, can only be realized as hardware in a relatively complex way. Systems comprising negative stiffness usually only do so in a very limited working range. Examples include disc springs that are operated at the 'deflection point'. Solutions that exhibit negative stiffness over a larger working range or larger transverse travel are active elements in which the mechanical behavior must be realized via a control system.

The document WO 2019/185 196 A1 describes a linear magnetic spring and its use in vibration dampers: "The linear magnetic spring can also be used as a "negative spring". Like with a "positive spring", there is no force (momentum) in the centre or initial position. If the moving part deviates from this position, there is no restoring force, but a deflecting force (moment) that increases linearly with the deflection from the centre starting position."

The document BEI, T. et al. "Mitsubishi Electric Entwickelt eine Passive Vorrichtung für die Regelung der Seilschwingungen bei Aufzügen in Hochhäusern", Mitsubishi Electric Corporation Public Relations Division, Feb. 7, 2019, pp. 1-4 describes a passive device with a negative stiffness for controlling cable vibrations in lifts in high-rise buildings. Negative stiffness is a well-known principle. A force acts in the opposite direction to the restoring force of a normal spring. The negative stiffness is achieved by permanent magnets that are placed facing each other in order to clamp the rope between them.

Further examples of the use of negative stiffnesses are given.

For example, the document EP 3 521 656 A1 illustrates a vibration isolation device with a negative stiffness.

The document DE 10 2014 118 609 A1 describes a method and a device for active suspension damping with a negative stiffness.

It is therefore the problem to be solved of the invention to create a crankshaft arrangement with improved isolation of the drive train.

The problem is solved by the subject matter of the independent claims.

One inventive idea is based on the realization that an additional coupling of the components already present in the Flywheel-Integrated Damper and Coupling FIDC allows for the isolation of the drive train to be improved decisively. This additional coupling is the coupling of the inertia ring (the cancellation mass) to the secondary side of the coupling. The decisive factor here is that this additional coupling comprises a negative stiffness, which results in the desired behavior.

A crankshaft arrangement for a combustion engine according to the invention includes a.) a crankshaft; b.) a torsional vibration damper with a primary mass and an inertia ring; c.) wherein the primary mass is firmly connected to the crankshaft and the inertia ring and the primary mass are coupled via a viscous fluid; d.) wherein the torsional vibration damper is attached to an output end of the crankshaft; e.) wherein the primary mass is coupled to a secondary coupling via an elastic coupling device. The torsional vibration damper is coupled to the secondary coupling via a feedback device. The secondary coupling is formed as a dual-mass flywheel with a primary flywheel, a secondary flywheel and the elastic coupling device.

One advantage is provided by the possibility to isolate the drive trains of trucks even at low speeds during operation.

Surprisingly, this embodiment enables significantly lower engine rotational speeds or compressor rotational speeds when used in drive trains. This has the advantage of increasing efficiency as friction is minimised. Another advantage of such a system is that it can also be used in smaller combustion engines in lorries or cars.

The combination of a dual-mass flywheel with a torsional vibration damper integrated into the flywheel mass and additional negative stiffness in the feedback contributes to an advantageous improvement in the degree of isolation of drive trains in trucks, cars, buses and the like.

A dual-mass flywheel comprises two masses, a primary flywheel and a secondary flywheel, which are connected to each other by a coupling, e.g. a spring damping system.

In a preferred embodiment, the feedback device comprises a negative stiffness. This additional coupling with the negative stiffness can advantageously achieve a substantial reduction in torsional vibration and rotational non-uniformity. In this way, a desired behavior can be achieved with the negative stiffness. Even if mechanical components with negative stiffness behave unstable individually, the stability of the overall system can be achieved by the other components already present.

The advantage here is that by the feedback device the secondary side of the drive train can comprise significantly less rotational non-uniformity than in the prior art.

Another advantage is that less stress can be placed on the components of the drive train, such as reduced gear wear. In the case of a generator, the "cleanliness" of a sinusoidal oscillation of the generated alternating current can be increased, i.e. frequency stability and amplitude stability can be improved.

A method according to the invention for torsional vibration damping of a crankshaft of the above-mentioned crankshaft arrangement includes the process steps S1, S2 and S3, wherein in the first process step (S1) a device is provided which comprises a torsional vibration damper with a primary coupling with a primary mass and with an external inertia ring and a secondary coupling as a dual-mass flywheel with an elastic coupling device, wherein, in a second process step (S2), torsional vibration damping takes place by means of a coupling of the inertia ring with the primary mass, wherein further damping is implemented by means of a coupling of the primary mass in turn with the dual-mass flywheel. And wherein, in a third process step (S3), torsional vibration damping and simultaneous isolation of a drive train is implemented by means of a negative stiffness, which causes feedback of the secondary flywheel of the dual-mass flywheel to the inertia ring, wherein the primary mass of the torsional vibration damper is coupled to the primary flywheel of the dual-mass flywheel.

In contrast to the state of the art, this type of coupling by means of negative stiffness is particularly advantageous, as an improved reduction of rotational non-uniformity and a simultaneous very good isolation of a drive train of a crankshaft can be achieved in contrast to the state of the art.

Advantageous developments of the invention are indicated by the dependent claims.

In one embodiment, it is provided that the primary mass of the torsional vibration damper is coupled to the primary flywheel of the dual-mass flywheel, wherein the primary flywheel of the dual-mass flywheel is coupled to the secondary flywheel of the dual-mass flywheel by means of the elastic coupling device. In other words, the torsional vibration damper is integrated into the mass of the primary flywheel of the dual-mass flywheel. This results in an advantageously compact and efficient design.

It is also envisaged that the feedback device is arranged between the inertia ring of the torsional vibration damper and the secondary flywheel of the dual-mass flywheel. In this way, an advantageously simple feedback function can be realized between the components.

In a further embodiment, the inertia ring of the torsional vibration damper is an external inertia ring to which the feedback device is coupled. This is advantageous as the inertia ring is easily accessible from the outside for the feedback device.

In a still further embodiment, the negative stiffness comprises spring elements. Springs are common components that are advantageously available on the market in high quality and at low cost.

The spring elements of the negative stiffness of the feedback device are evenly distributed on the circumference of an outer ring of the secondary coupling and on an opposite edge of the inertia ring of the torsional vibration damper and extend in a radial direction. This results in an advantageous, simple and space-saving design.

It is advantageous if the spring elements of the negative stiffness of the feedback device each comprise at least one pre-tensioned coil spring. This makes it advantageously easy to adjust and adapt each spring.

In a preferred embodiment, the feedback device with the negative stiffness comprises four or more spring elements.

In an alternative embodiment, the negative stiffness of the feedback device comprises magnet elements. This is advantageous as these common components are available on the market at low cost with high quality.

Thus, in a further embodiment, first magnet elements are evenly distributed around the circumference of one edge of the inertia ring, with second magnet elements evenly distributed around the circumference of an outer ring of the secondary coupling. This design is compact and space-saving.

In a preferred embodiment, the feedback device with the negative stiffness may comprise at least four or more first magnet elements and at least four or more second magnet elements. The advantage here is the adaptability to different applications.

A still further embodiment provides that an angle between each two neighboring first magnet elements and an angle between each two neighboring second magnet elements about an axis of rotation is 90°, whereby an angle between a first magnet element and a second magnet element about the axis of rotation comprises a value of 45°. This design is advantageously simple and compact.

In another embodiment, the first magnet elements have a North pole pointing towards the axis of rotation, while the second magnet elements have a North pole pointing towards the axis of rotation. This is advantageous for the setting of the negative stiffness.

It is also advantageous that the magnet elements are permanent magnets, which are available as conventional components at low cost with high quality.

If the magnet elements are formed as electromagnets, the values of the negative stiffness can be set, adjusted and also controlled as a function of corresponding parameters via a corresponding control device. In this way, a positive feedback amplifier can be advantageously realized.

A combination of permanent magnets and electromagnets can also be advantageous in certain applications.

A further combination of spring elements and magnet elements is also conceivable and advantageously extends adaptability to different applications.

Examples of embodiments of the invention are described below with reference to the accompanying drawings. These embodiments merely serve to illustrate the invention by means of preferred constructions, which, however, do not conclusively represent the invention. In this respect, other embodiments as well as modifications and equivalents of the illustrated embodiments can also be realized within the scope of the claims.

DETAILED DESCRIPTION OF THE DRAWINGS

Figure 1:
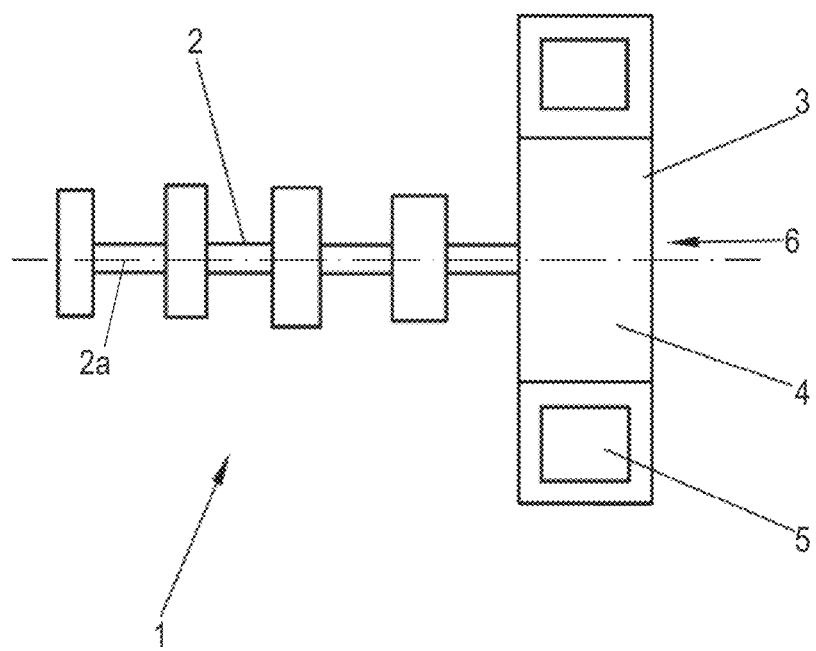
FIG. 1 is a schematic representation of a crankshaft arrangement according to the state of the art.

FIG. 1 shows a schematic representation of a crankshaft arrangement according to the state of the art.

Figure 2:
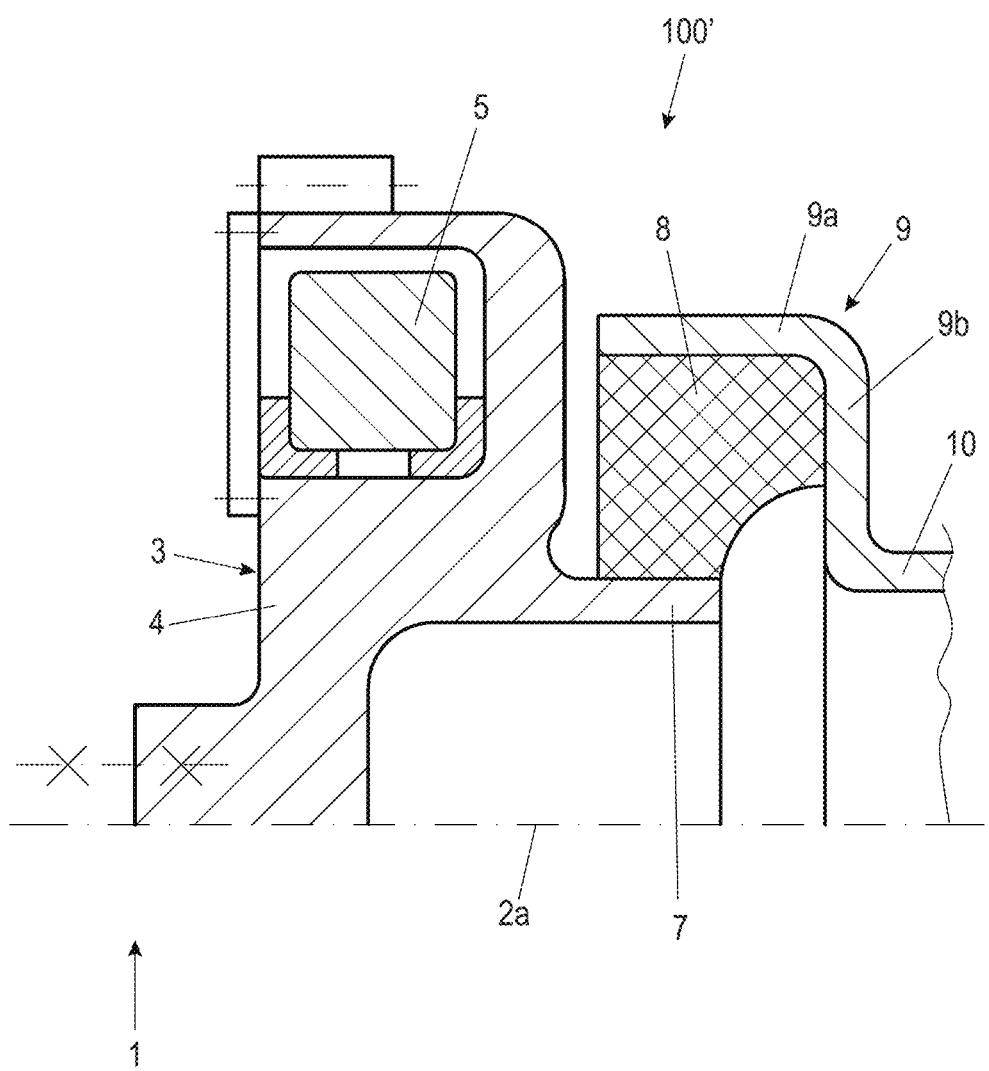
FIG. 2 is a schematic section of a further crankshaft arrangement or a device for damping torsional vibration according to the state of the art.

FIG. 2 shows a schematic section of a further crankshaft arrangement or device 100' for damping torsional vibrations according to the state of the art.

The crankshaft arrangement 1 is particularly suitable for a reciprocating piston engine, especially for a combustion engine. A crankshaft 2 with an axis of rotation 2a is connected to a torsional vibration damper 3 at a drive end 6. The torsional vibration damper 3 is thus located at an original position of the flywheel, which is not shown.

As the torsional vibration damper 3 also performs the task of reducing the rotational non-uniformity of the engine to which the crankshaft 2 is assigned, it requires suitable coordination between a primary mass 4, which is firmly connected to the crankshaft 2, and a secondary mass 5, which is attached to the primary mass 4 in a seismic, elastically damping manner.

The suitable tuning means that at low speeds, i.e. at low frequencies, the connection between the primary mass 4 and the secondary mass 5 can be considered rigid. Both masses 4 and 5 form a unit, so to speak, and act as a flywheel at low speeds. In this situation, torsional vibration plays a subordinate role in an engine. A further flywheel is not necessary in such a crankshaft arrangement 1.

At higher speeds, i.e. at higher frequencies, the larger secondary mass 5 comes into its own and dampens the torsional vibrations. The torsional vibration damper 3 operates in its original form. In this operating state, i.e. at high speeds, rotational non-uniformity plays a subordinate role.

The crankshaft arrangement 1 shown in the example shows a principle sketch for a four-cylinder engine. The invention is not intended to be limited to this; it can also be used as a crankshaft arrangement for engines with a lower or higher number of cylinders, in particular with six, eight, ten, twelve or more cylinders or also V-engines with up to 20 cylinders.

The torsional vibration damper 3 in FIG. 2 is, for example, a viscous damper and comprises the primary mass 4, which is firmly connected to the crankshaft, and the secondary mass 5, which is formed here as a ring which can rotate in a chamber of the primary mass 4, a gap between these two masses being filled with viscous medium, e.g. silicone oil. A suitable tuning also has the effect here that at low speed, i.e. at low frequencies, the primary mass 4 and the secondary mass 5 can be regarded as a single unit A coupling function section with an elastomer coupling ring 8 is also integrated directly into the torsional vibration damper 3 and forms a secondary coupling 9. The elastomer coupling ring 8 is connected on the one hand to a hub-like inner ring 7 of the primary mass 4 and on the other hand to the outer ring 9a of the secondary coupling 9. The outer ring 9a is coupled via a connecting section 9b to an output 10, e.g. an input element of an otherwise not shown transmission, which is part of a drive train that is also not shown but can be imagined.

This embodiment is also known as "Flywheel-Integrated Damper and Coupling" (FIDC).

Figure 3:
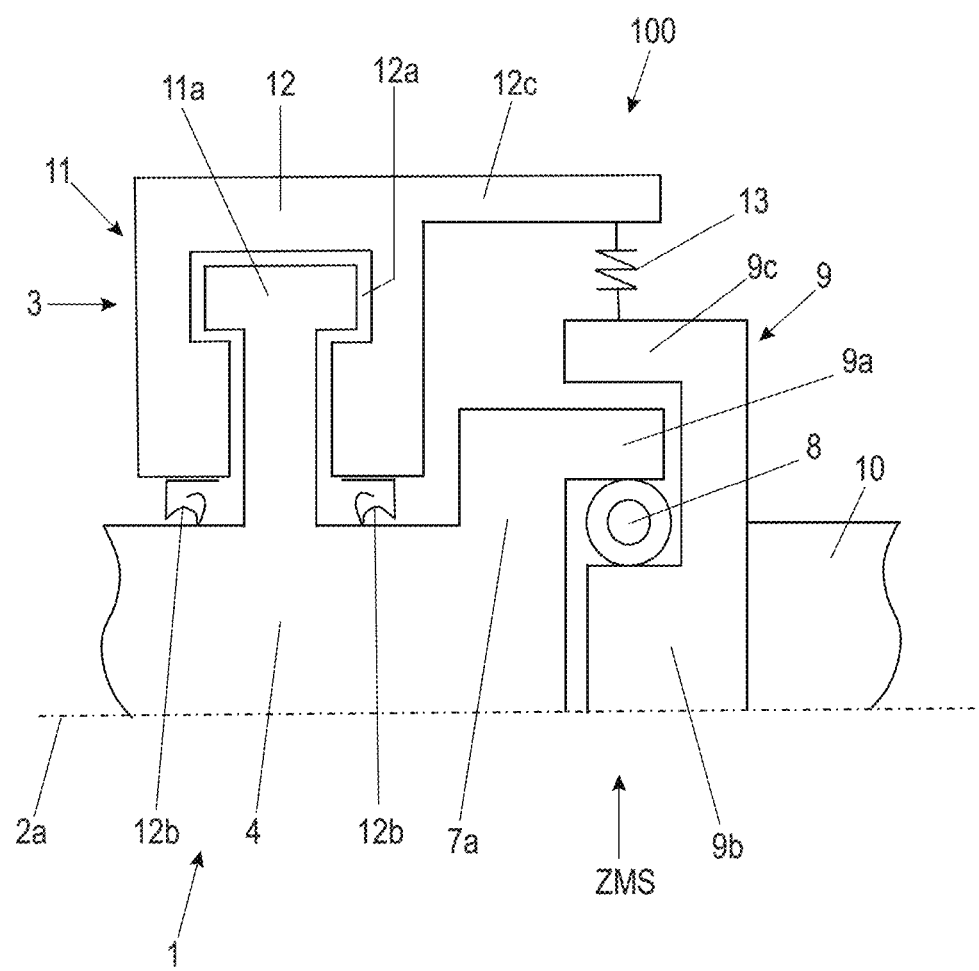
FIG. 3a is a schematic section of a crankshaft arrangement according to the invention with an embodiment example of the device according to the invention for damping torsional vibrations.

FIG. 3 schematically shows a section of a crankshaft arrangement 1 according to the invention with an embodiment example of the device 100 according to the invention for damping torsional vibrations.

The device 100 includes a primary coupling 11 as a viscous torsional vibration damper 3 with a primary mass 4 and an inertia ring 12, a secondary coupling 9 with an elastic coupling device 8 and a feedback device 13.

The inertia ring 12 of the torsional vibration damper 3 is an external inertia ring 12 and is coupled to the primary mass 4. This is shown in FIG. 3 as an example of a primary coupling 11.

The primary coupling 11 includes the primary mass 4 connected to the crankshaft 2, which has a disc-shaped damper element 11a with a circumferential collar, and the inertia ring 12 with a chamber 12a, in which the damper element 11a is accommodated with a fluid not described in detail. The chamber 12a is sealed with respect to the shaft of the primary mass 4 by means of seals 12b not described in detail. This structure comprises a certain stiffness and damping.

In contrast to the inertia ring 5 from the prior art as shown in FIG. 2, the inertia ring 12 is formed here as an external inertia ring 12. The inertia ring 12 also comprises a circumferential edge 12c, which faces the output drive 10. The edge 12c is described further below.

The secondary coupling 9 is formed here as a dual-mass flywheel ZMS and includes a primary flywheel 9a, a secondary flywheel 9b and the elastic coupling device 8.

The primary mass 4 of the torsional vibration damper 3 is in turn coupled to the dual-mass flywheel ZMS. This is explained in more detail below.

An example of this coupling is shown in FIG. 3. Here, instead of the inner ring 7 (see FIG. 2), a connection ring 7a is provided, which on the one hand is firmly connected to the torsional vibration damper 3, pointing towards its primary mass 4. On the other hand, the outer diameter of the connection ring 7a is widened towards the output drive 10, whereby the outer diameter is connected to the primary flywheel 9a of the dual-mass flywheel ZMS.

In this way, the torsional vibration damper 3 is integrated into the mass of the primary flywheel 9a of the dual-mass flywheel ZMS.

The primary flywheel 9a of the dual-mass flywheel ZMS is coupled to the secondary flywheel 9b of the dual-mass flywheel ZMS like a conventional dual-mass flywheel by means of the coupling device 8.

Like a conventional dual-mass flywheel ZMS, the coupling device 8 can comprise, for example, a spring damping system with positive stiffness. Such a spring damping system may include, for example, arcuate spiral springs, membranes, bearings, compression springs and lubricant.

The secondary flywheel 9b of the dual-mass flywheel ZMS is also connected to the output drive 10 so that it cannot rotate. In addition, the secondary flywheel 9b of the dual-mass flywheel ZMS comprises a circumferential collar 9c on its outer diameter. The collar 9c forms a feedback section of the dual-mass flywheel ZMS.

In contrast to the prior art, the inertia ring 12 of the torsional vibration damper 3 is coupled to the secondary coupling 9, i.e. to the dual-mass flywheel ZMS, via a stiffness. This stiffness is formed here as a so-called negative stiffness of the feedback device 13. The feedback device 13 connects the edge 12c of the inertia ring 12 of the torsional vibration damper 11 to the collar 9c of the secondary flywheel 9b of the dual-mass flywheel ZMS.

Other configurations of the device 100 shown schematically here in FIG. 3 are of course possible.

The feedback device 13 forms an additional coupling of the components already present in the FIDC (see FIG. 2) and leads to a decisive improvement in the isolation of the drive train. This additional coupling is the coupling of the inertia ring 12 (the cancellation mass) to the secondary flywheel 9*b* of the dual-mass flywheel ZMS, i.e. to its collar 9*c*.

The decisive factor here is that this additional coupling must have a negative stiffness in order to achieve the desired behavior. Mechanical components with negative stiffness behave unstable individually, the stability of the overall system is achieved by the other existing couplings.

The coupling of the inertia ring 12 to the secondary flywheel 9*b* of the dual-mass flywheel ZMS by means of negative stiffness can be achieved via various technical approaches, e.g. via appropriately arranged magnets or via pre-tensioned springs or via an active system with a positive feed-back amplifier.

Figure 4:
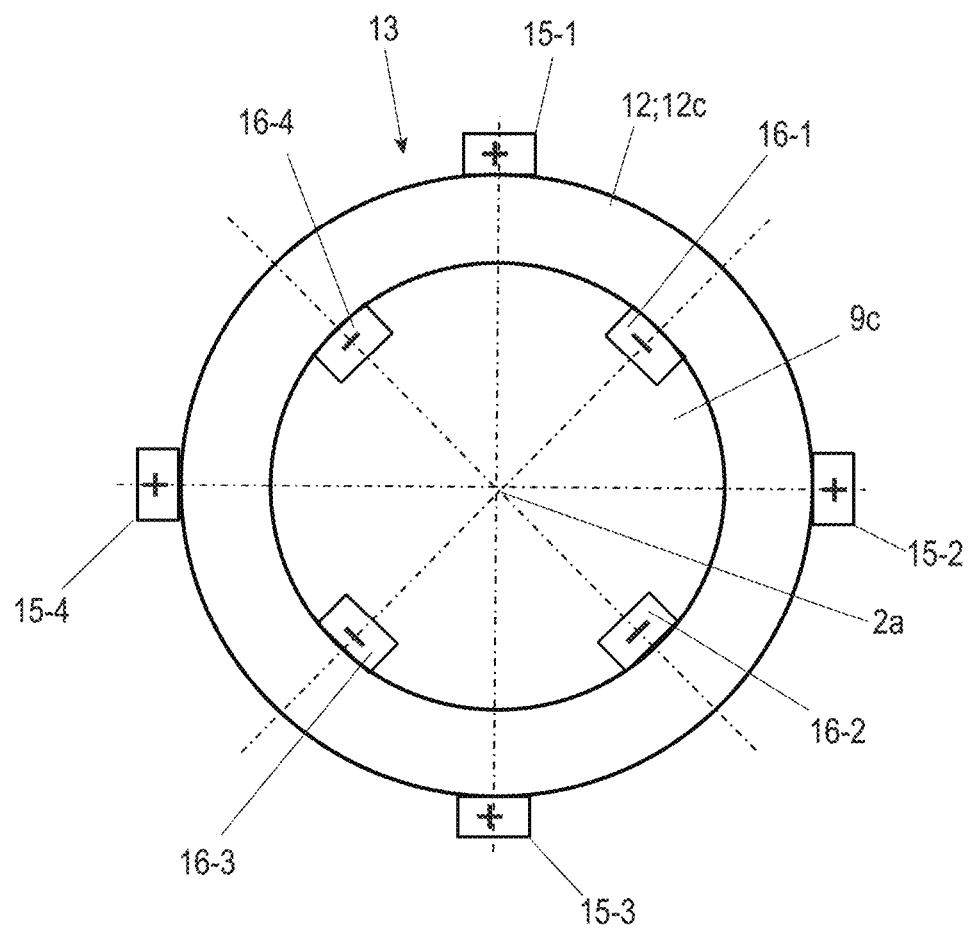
FIGS. 4-5 are schematic views of embodiments of a feedback device with negative stiffnesses.

FIG. 4 shows a schematic view of a second embodiment of the feedback device 13 with negative stiffness with magnet elements 15-1, 15-2, 15-3, 15-4 and 16-1, 16-2, 16-3, 16-4.

Figure 5:
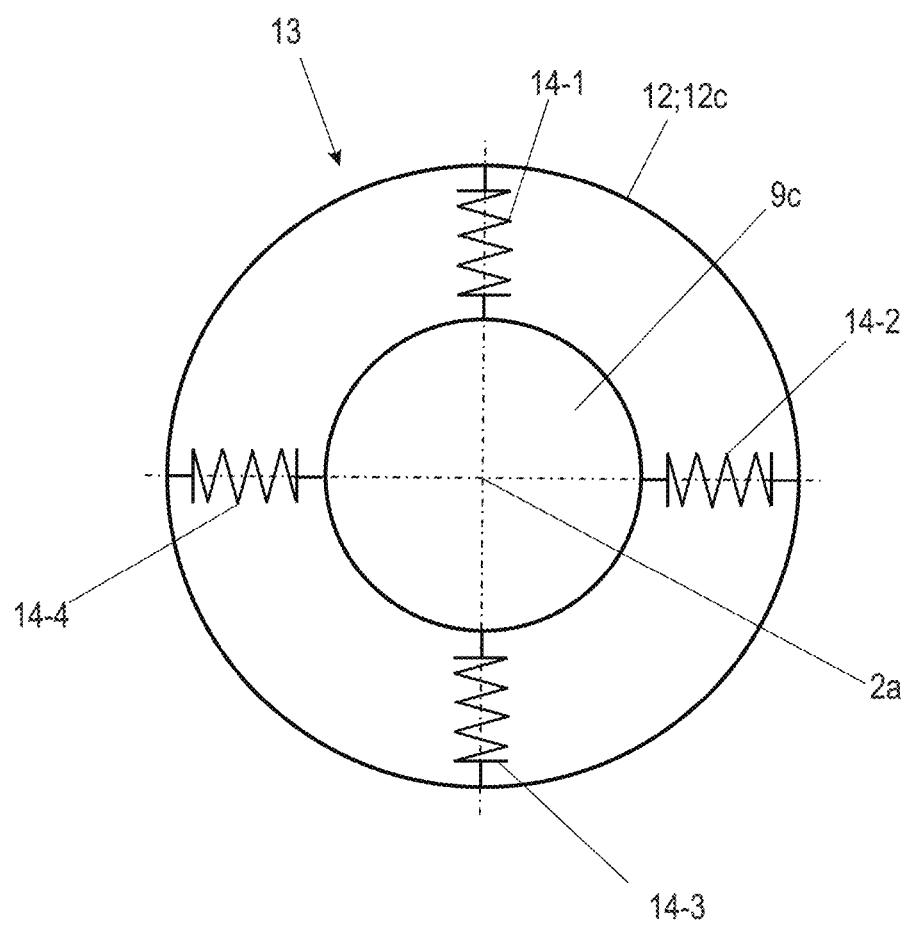

FIG. 5 shows a schematic view of a first embodiment of the feedback device 13 with negative stiffness with spring elements 14.

In this first embodiment example, the feedback device 13 comprises four spring elements 14-1, 14-2, 14-3 and 14-4, which are evenly distributed around the circumference of the collar 9*c* of the secondary flywheel 9*b* of the dual-mass flywheel ZMS and on the opposite edge 12*c* of the inertia ring 12 and extend in a radial direction. An angle between each two neighboring spring elements 14-1, 14-2, 14-3, 14-4 about the axis of rotation 2*a* is 90° here.

Each spring element 14-1, 14-2, 14-3, 14-4 consists here of at least one preloaded coil spring. Of course, more than four spring elements 14 can also be used In the second embodiment example of the feedback device 13, four first magnet elements 15-1, 15-2, 15-3, 15-4 are attached evenly around the circumference of the edge 12*c* of the inertia ring 12 in such a way that their respective North pole, labelled "+" here, points towards the axis of rotation 2*a*. An angle between each two neighboring first magnet elements 15-1, 15-2, 15-3, 15-4 around the axis of rotation 2*a* is 90° here.

In addition, four second magnet elements 16-1, 16-2, 16-3, 16-4 are mounted evenly on the circumference of the collar 9*c* of the secondary flywheel 9*b* of the dual-mass flywheel ZMS. An angle between each two neighboring second magnet elements 16-1, 16-2, 16-3, 16-4 around the axis of rotation 2*a* is 90°, whereby an angle between a first magnet element 15-1, 15-2, 15-3, 15-4 and a second magnet element 16-1, 16-2, 16-3, 16-4 around the axis of rotation 2*a* comprises a value of 45°.

The second magnet elements 16-1, 16-2, 16-3, 16-4 are arranged such that their South pole, labelled "−" here, points radially outwards away from the axis of rotation 2*a*, or their North pole points towards the axis of rotation 2*a*.

The magnet elements 15-1, 15-2, 15-3, 15-4 and 16-1, 16-2, 16-3, 16-4 are arranged here so that the annular area between the collar 9*c* of the secondary flywheel 9*b* of the dual-mass flywheel ZMS and the inside of the rim 12*c*, which faces the axis of rotation 2*a*, remains free.

The magnet elements 15-1, 15-2, 15-3, 15-4 and 16-1, 16-2, 16-3, 16-4 are formed here as permanent magnets. However, it is also conceivable that they could be implemented as electromagnets. In this case, control of the feedback device 13 formed in this way is conceivable. Control as a function of different parameters, e.g. speed, motor load, etc., is also conceivable. In this way, the active system with positive feedback amplifier indicated above could be realized.

More than four magnet elements 15-1, 15-2, 15-3, 15-4 and 16-1, 16-2, 16-3, 16-4 can also be used in each case.

Figure 6:
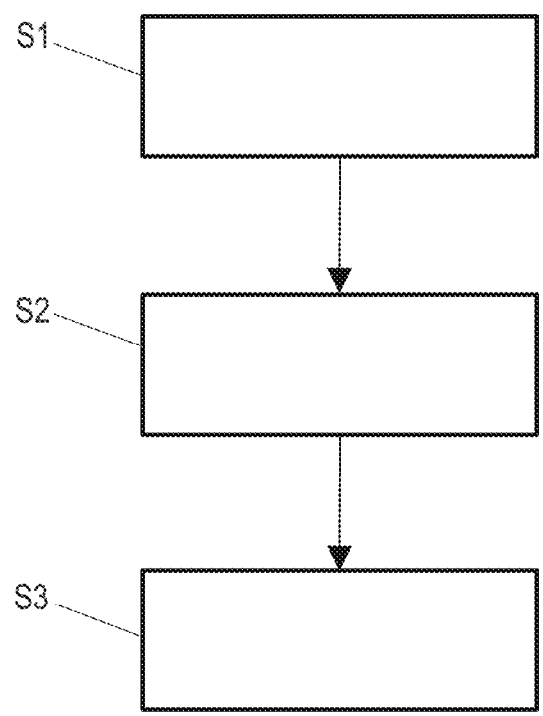
FIG. 6a is a schematic flow diagram of a method according to the invention.

FIG. 6 shows a schematic flow diagram of a method according to the invention for dampering torsional vibrations of a crankshaft 2.

In a first process step S1, a device 100 is provided which comprises a torsional vibration damper 3 with a primary coupling 11 with a primary mass 4 and an inertia ring 12 and a secondary coupling 9 as a dual-mass flywheel ZMS with an elastic coupling device 8.

A second process step S2 provides for torsional vibration damping by means of coupling of the inertia ring 12 to the primary mass 4, with further damping being implemented by means of coupling of the primary mass 4 to the dual-mass flywheel ZMS.

Finally, in a third process step S3, the torsional vibrations are damped and a drive train is simultaneously isolated by means of negative stiffness, which causes feedback from the secondary flywheel 9*b* of the dual-mass flywheel ZMS to the inertia ring 12, whereby the primary mass 4 of the torsional vibration damper 3 is coupled to the primary flywheel 9*a* of the dual-mass flywheel ZMS.

In this way, rotational non-uniformity and torsional vibrations can be significantly reduced, resulting in improved isolation of the drive train. In addition, less stress can be placed on the components of the drive train, such as reduced gear wear. In the case of a generator, the "cleanliness" of a sinusoidal oscillation of the generated alternating current can be increased, i.e. frequency stability and amplitude stability can be improved.

The device 100 can be used in drive trains of trucks, possibly cars, buses, etc.

The invention is not limited by the embodiment example given above, but is modifiable within the scope of the claims.

It is conceivable that the feedback device 13 comprises a combination of spring elements 14 and magnet elements 15, 16 15-1, 15-2, 15-3, 15-4 and 16-1, 16-2, 16-3, 16-4.

The magnet elements 15-1, 15-2, 15-3, 15-4 and 16-1, 16-2, 16-3, 16-4, can also be combined as permanent magnets and electromagnets.

LIST OF REFERENCE SIGNS

1 Crankshaft arrangement
2 Crankshaft
2*a* Axis of rotation
3 Torsional vibration dampers
4 Primary mass
5 Secondary mass
6 Drive end crankshaft
7 Inner ring
7*a* Connecting ring
8 Coupling device
9 Secondary coupling
9*a* Primary flywheel
9*b* Secondary flywheel
9*c* Collar
10 Drive
11 Primary clutch coupling
11*a* Damper element
12 Flywheel
12*a* Chamber
12*b* Sealing element
12*c* Edge
13 Feedback device
14-1; 14-2; 14-3; 14-4 Spring element 15-1; 15-2; 15-3; 15-4 First magnet element
16-1; 16-2; 16-3; 16-4 Second magnet element
S1; S2; S3 Process step
ZMS Dual mass flywheel

The invention claimed is:

1. A crankshaft arrangement for a combustion engine, comprising:
   a crankshaft;
   a torsional vibration damper with a primary mass and an inertia ring;
   wherein the primary mass is firmly connected to the crankshaft, and the inertia ring and the primary mass are coupled via a viscous fluid;
   wherein the torsional vibration damper is attached to an output end of the crankshaft;
   wherein the primary mass is coupled to a secondary coupling via an elastic coupling device;
   wherein the torsional vibration damper is coupled to the secondary coupling via a feedback device; and
   wherein the secondary coupling is formed as a dual-mass flywheel with a primary flywheel, a secondary flywheel and the elastic coupling device.

2. The crankshaft arrangement according to claim 1, wherein the feedback device comprises a negative stiffness.

3. The crankshaft arrangement according to claim 1, wherein
   the primary mass of the torsional vibration damper is coupled to the primary flywheel of the two-mass flywheel, and
   the primary flywheel of the two-mass flywheel is coupled to the secondary flywheel of the two-mass flywheel via the elastic coupling device.

4. The crankshaft arrangement according to claim 3, wherein
   the feedback device is arranged between the inertia ring of the torsional vibration damper and the secondary flywheel of the two-mass flywheel.

5. The crankshaft arrangement according to claim 1, wherein
   the inertia ring of the torsional vibration damper is an external inertia ring.

6. The crankshaft arrangement according to claim 2, wherein
   the negative stiffness comprises spring elements.

7. The crankshaft arrangement according to claim 6, wherein
   the spring elements of the negative stiffness of the feedback device are evenly distributed on a circumference of an outer ring of the secondary coupling and on an opposite edge of the inertia ring of the torsional vibration damper, and extend in a radial direction.

8. The crankshaft arrangement according to claim 6, wherein
   the spring elements of the negative stiffness of the feedback device each comprise at least one preloaded coil spring.

9. The crankshaft arrangement according to claim 6, wherein
   the feedback device with the negative stiffness comprises four or more spring elements.

10. The crankshaft arrangement according to claim 2, wherein
    the negative stiffness of the feedback device comprises magnet elements.

11. The crankshaft arrangement according to claim 10, wherein
    first magnet elements are mounted evenly distributed on the circumference of an edge of the inertia ring, and
    second magnet elements are mounted evenly distributed on the circumference of an outer ring of the secondary coupling.

12. The crankshaft arrangement according to claim 11, wherein
    the feedback device with the negative stiffness comprises at least four or more first magnet elements and at least four or more second magnet elements.

13. The crankshaft arrangement according to claim 10, wherein
    the magnet elements are permanent magnets and/or are formed as electromagnets.

14. A method for damping torsional vibrations of a crankshaft of a crankshaft arrangement, the method comprising:
    in a first process step, a device is provided which comprises a torsional vibration damper with a primary coupling with a primary mass and with an external inertia ring, and a secondary coupling as a dual-mass flywheel with an elastic coupling device,
    in a second process step, torsional vibration damping takes place by coupling of the inertia ring to the primary mass, wherein further damping is implemented by coupling of the primary mass in turn to the dual-mass flywheel,
    in a third process step, torsional vibration damping and simultaneous isolation of a drive train by use of a negative stiffness, which causes feedback of the secondary flywheel of the dual-mass flywheel to the inertia ring, wherein the primary mass of the torsional vibration damper is coupled to the primary flywheel of the dual-mass flywheel.

* * * * *